F. J. SCHRANK.
TIRE.
APPLICATION FILED DEC. 31, 1920.

1,411,671.

Patented Apr. 4, 1922.

INVENTOR.
Fred J. Schrank
BY
ATTORNEY.

UNITED STATES PATENT OFFICE.

FRED J. SCHRANK, OF AKRON, OHIO, ASSIGNOR TO THE SWINEHART TIRE & RUBBER COMPANY, OF AKRON, OHIO, A CORPORATION OF OHIO.

TIRE.

1,411,671.  Specification of Letters Patent.  Patented Apr. 4, 1922.

Application filed December 31, 1920. Serial No. 434,230.

*To all whom it may concern:*

Be it known that I, FRED J. SCHRANK, a citizen of the United States, residing at Akron, in the county of Summit and State of Ohio, have invented a certain new and useful Improvement in Tires, of which the following is a full, clear, and exact description, reference being had to the accompanying drawings.

This invention relates to vehicle tires and especially to those of the cushion type as employed particularly on self-propelled trucks, although not restricted thereto. Such tires are made of some elastic cushioning material, as exemplified by a rubber composition, and my invention has for its objects the provision of a structure which shall possess an enhanced cushioning effect, which shall remain cool under all conditions of service, and which shall stand extreme overloads and other hard usage with a minimum of injury, and as a result shall afford unusually long wear. Other objects of the invention are the provision of a cellular tire having means for impeding the entrance of sand and foreign matter into the cells and for decreasing the weakening effect of those cells; while further objects and advantages of the invention will appear as the description proceeds.

Figure 1:
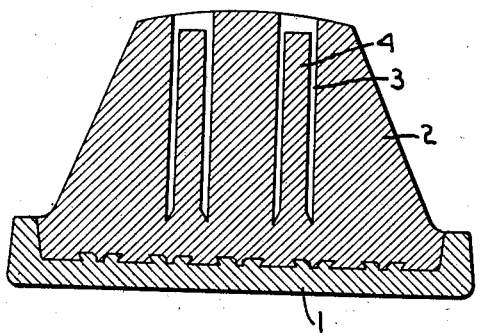
Figure 2:
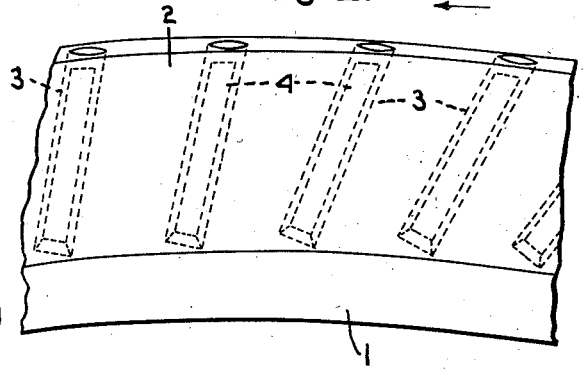
Figure 3:
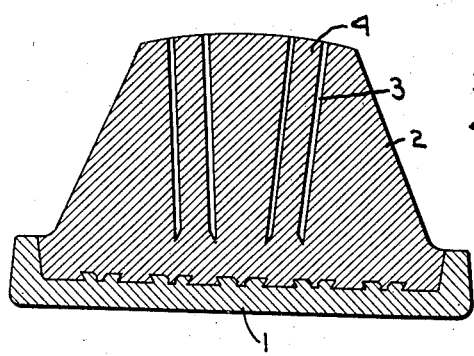
Figure 4:
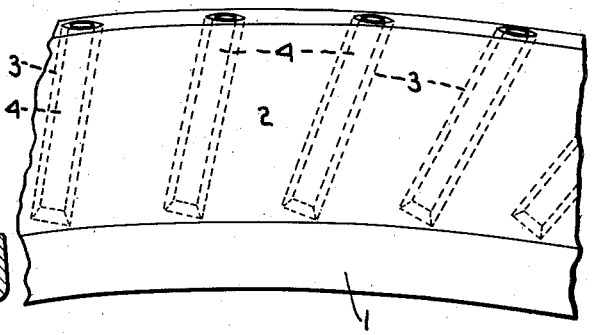

In the drawings accompanying and forming a part of this application, I have shown certain illustrative embodiments of my invention although without intent to limit myself thereto, since the same can be embodied in numerous other specific forms. Fig. 1 represents a cross sectional view and Fig. 2 a partial elevation of a tire embodying my improvements; Figs. 3 and 4 are similar views of a modified construction; and Fig. 5 is a fragmental perspective view partly in section, illustrating the behavior of such a tire in actual use.

Broadly speaking, my invention consists in molding in the tread portion of a solid elastic tire, a plurality of openings extending from the tread portion thereof inwardly toward the base of the tire, each opening being obliquely inclined relatively to the corresponding radius of the tire and having an elastic or flexible core which projects nearly or quite to the tire surface. These cores are preferably (but not necessarily) of the same material as the tire, and preferably extend to a point rather near the base thereof, and may be either staggered or abreast, parallel or flaring, small or large, deep or shallow, and their inclination may be either circumferential or lateral.

Describing by reference characters the parts shown in the drawings, 1 represents the flanged rim or tire base, and 2 represents the elastic cushioning material mounted thereon and constituting the tire. Neither the shape of the rim nor the shape, design or mode of attachment of the tire is important to the present invention. 3—3 represent annular recesses which extend from the tread portion of the tire into the substance thereof the desired distance, and 4—4 represent the cores located therein. In Figs. 1 and 2 the cores are integral with the tire substance and slightly shorter than the recesses so as to terminate a short distance inside the tread. The recesses are also arranged at an angle to the radius, but parallel to the plane of the wheel. In Figs. 3 and 4 the cores are made of a separate flexible substance, adhesively united at their inner ends to the tire material, and arranged obliquely to the plane of the wheel. The above named variations and arrangements and substances can be varied indefinitely, as can also the relative sizes of core and opening, although in most cases a small clearance is left between the core and opening in order to afford traction and to afford an alternate inspiration and expiration of air during the revolution of the tire so that the interior parts are kept cool.

Figure 5:
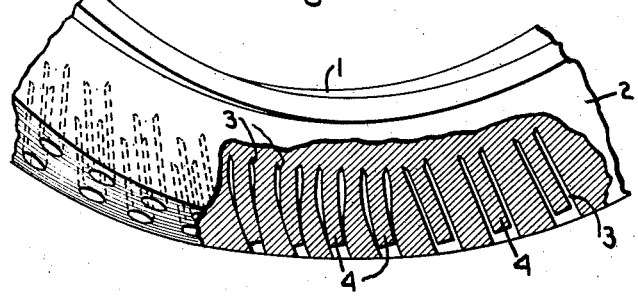

When the apertures are inclined as illustrated in Fig. 2, the wheel is preferably rotated in the direction shown in the arrows, which causes a progressive closing of the recesses as they approach the ground or working portions of the tire, as illustrated in Fig. 5, thereby minimizing the entrance of dirt, and entrapping a considerable quantity of air in each of the little pockets so formed which enhances the resiliency at this point. As the wheel rolls along freeing each recess or pocket from pressure the mouth opens and the heated air escapes to be replaced by cooler air, thus preventing overheating of the tire substances. The presence of the cores causes the mouths of the recesses to become sealed with a smaller pressure and hence at an earlier period than if the cores were absent, thereby retaining a sufficient amount of air for the purpose in view, and also prevents the walls of the recesses from being completely squeezed together as would be the case if the cores were absent. The inclination of the recesses leads to a closing action produced by the weight of the vehicle which closing action tends to be effected by a pinching of the walls laterally together in a manner quite different from that observed when the recesses are radial. In the absence of the cores the load which can safely be carried by the tires is quite limited, since the complete closing of such empty inclined recesses by lateral flattening every revolution of the wheel soon causes cracks to appear which shortly lead to a disintegration of the entire tread; this is avoided by the use of the cores which prevent the flattening of the recesses, no matter what the load may be. The recesses also have a tendency to decrease slipping and skidding, particularly in case the cores be somewhat shorter than the holes, and in practice these cores tend to wear away slightly faster than the tread itself, thereby maintaining this condition, although by making them of the proper substances this can be overcome.

The shape, size, depth, and arrangement of these recesses and cores is entirely within the selection of the tire maker. As a satisfactory example, but without intent to limit myself thereto, I will instance the following dimensions: exterior diameter of tire—34 inches; thickness of tire—4 inches; width at base—6 inches; width at tread—3 inches; diameter of hole—$\frac{9}{16}$ inch; depth of hole—$3\frac{1}{4}$ inches; diameter of core—$\frac{7}{16}$ inch; inclination of hole—12° from radius.

It will be understood that I do not confine myself to this particular shape or mounting of tire or to any of the dimensions, details, designs, or arrangements herein set forth except as the same are specifically recited in my claims.

Having thus described my invention, what I claim is:

1. An elastic vehicle tire having a plurality of annular cavities in its tread portion, the central cores thereof being of flexible material and extending to a point near the tread surface, said cavities being obliquely inclined relatively to the corresponding radii of the tire.

2. An elastic vehicle tire having annular inclined recesses opening through its tread surface, the central cores thereof being imperforate and of flexible elastic material.

3. An elastic tire having formed around its periphery a plurality of recesses arranged at an angle to the radii of the wheel on which said tire is mounted and terminating short of the tire base, each of said recesses having therein an imperforate core of flexible material secured to the base of the recess and projecting to a point near the tread surface.

In testimony whereof, I hereunto affix my signature.

FRED J. SCHRANK.